(12) United States Patent
Chiang et al.

(10) Patent No.: US 6,977,705 B1
(45) Date of Patent: Dec. 20, 2005

(54) STRUCTURE FOR REDUCING THE DIFFRACTION EFFECT IN PERIODIC ELECTRODE ARRANGEMENTS AND LIQUID CRYSTAL DEVICE INCLUDING THE SAME

(75) Inventors: Hsin-Chun Chiang, Hsinchu (TW); Tsan-Yu Ho, Tainan (TW); Chia-Rong Sheu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 117 days.

(21) Appl. No.: 10/660,575

(22) Filed: Sep. 12, 2003

(30) Foreign Application Priority Data

Jan. 3, 2003 (TW) .............................. 92100124 A

(51) Int. Cl.$^7$ ........................................... G02F 1/1343
(52) U.S. Cl. ...................................... 349/138; 349/139
(58) Field of Search ................................ 349/141, 129, 349/122, 138, 137

(56) References Cited

U.S. PATENT DOCUMENTS

| | | | | |
|---|---|---|---|---|
| 3,736,047 A | * | 5/1973 | Gelber et al. ................ | 349/137 |
| 4,248,502 A | * | 2/1981 | Bechteler et al. ............ | 349/137 |
| 4,505,547 A | * | 3/1985 | Sekimura ..................... | 349/137 |
| 4,521,079 A | * | 6/1985 | Leenhouts et al. ........... | 349/137 |
| 4,556,288 A | * | 12/1985 | Sekimura ..................... | 349/137 |
| 5,914,761 A | * | 6/1999 | Ohe et al. .................... | 349/132 |

* cited by examiner

Primary Examiner—Kenneth Parker
(74) Attorney, Agent, or Firm—Birch, Stewart, Kolasch & Birch, LLP

(57) ABSTRACT

Structure for reducing the diffraction effect in periodic electrode arrangements and liquid crystal device including the same. The invention relates to a structure for reducing the diffraction effect in periodic electrode arrangements. The structure is used in a reflective or semi-transparent liquid crystal display with lateral electric fields. The light collecting efficiency is improved by using multiple (two or more) dielectric layers with different refractive index as passivation layers of transparent electrodes, and by adjusting thickness of each dielectric layer to obtain the same optical path between the passivation layers and the transparent electrodes when incident light is transmitted.

14 Claims, 6 Drawing Sheets

STRUCTURE FOR REDUCING THE DIFFRACTION EFFECT IN PERIODIC ELECTRODE ARRANGEMENTS AND LIQUID CRYSTAL DEVICE INCLUDING THE SAME

This nonprovisional application claims priority under 35 U.S.C. § 119(a) on patent application No. 092100124 filed in Taiwan on Jan. 3, 2003, which is herein incorporated by reference.

BACKGROUND OF THE INVENTION

1. Field of the Invention

The present invention relates to a structure improving the light utilization rate of LCDs (Liquid Crystal Displays), and in particular to a structure for reducing the diffraction effect in periodic electrode arrangements and liquid crystal devices including the same. Transparent dielectric layers having different diffraction indices are formed between periodic electrodes and thickness of each transparent dielectric layer is adjusted so that optical paths of the incident lights at the passivation layers and the transparent electrodes are equal. Light collection efficiency is thus improved.

2. Description of the Related Art

The display of light and dark on a thin film transistor liquid crystal display (TFT-LCD) is obtained by rotating the polarization direction of light, and by the birefringence characteristic of the liquid crystal. The main drawback of LCDs, when compared with self-illuminating displays, is narrow viewing angle, due mainly to do with the angle of incident light. Different viewing angles produce different display qualities, and the greater the viewing angle, the lower the contrast between viewing angles.

Recently, lateral electric field has been applied as a method for improving viewing angle, contrast and response in LCDs. Lateral electric field is produced by arranging the direction of the electric field and the liquid crystal molecules on the same plane to drive the liquid crystal molecules. Phase differences caused by incident light on different viewing angles are thus reduced. With pixel electrodes and common electrodes simultaneously disposed on the TFT matrix substrate, this method features larger viewing angle of liquid crystal display. In addition, electrodes are periodically disposed and the electric field parallels the panel.

Lateral electric field mode is suitable for transmissive, reflective and semi-transparent displays. Active driven techniques are well suited for semi-transparent displays, and exhibit advantages of both reflective and transmissive displays, such as amorphous-silicon TFT or low temperature polysilicon TFT. Therefore, current low-consumption IA products typically employ semi-transparent display panels. Electrodes, however, can only be placed on one side of the two substrates and strips of electrodes must be arranged periodically when applying lateral (horizontal) electric field. This is problematic as diffraction indices in periodic electrode arrangements and the surrounding dielectric material are different, thus incident light diffraction occurs. Consequently, the light utilization rate is reduced and stray light within the system further hinders display contrast. For projection systems, in particular, only reflected lights with smaller angles are collected, diffracted lights with greater angles lower the illumination efficiency considerably.

SUMMARY OF THE INVENTION

Accordingly, an object of the invention is to provide a structure for reducing the diffraction effect in periodic electrode arrangements and liquid crystal displays including the same.

In order to achieve the above object, the invention provides a structure for reducing the diffraction effect in periodic electrode arrangements, which features a novel structure comprised of dielectric materials and electrodes to prevent reduced illumination efficiency due to light diffraction caused by periodic electrode arrangements. The outcome includes higher light utilization rate and enhanced display quality.

The novel structure comprises dielectric materials and electrodes utilizing multiple (two or more) layers of transparent dielectric materials having different diffraction indices formed between periodic electrodes. Thicknesses for various transparent dielectric layers are modified so that the optical paths of the incident lights at the passivation layers or the transparent electrodes are identical. The angle of stray light and diffracted lights is reduced, thus solving the problem of reduced illumination efficiency associated with light diffraction.

The thickness of various transparent dielectric layers is modified in such a way that the diffraction index and thickness of the various dielectric layers and the transparent electrodes satisfy the following formula (I):

$$0.8 n_{ed} d_{ed} \leq n_1 d_1 + n_2 d_2 + \ldots + n_x d_x \leq 1.2 n_{ed} d_{ed}$$

wherein $n_1$ is the diffraction index of the first dielectric layer, $n_2$ is the diffraction index of the second dielectric layer, $n_x$ is the diffraction index of the $x^{th}$ dielectric layer, $n_{ed}$ is the diffraction index of the transparent electrode, $d_1$ is the partial or overall thickness ($\mu$m) of the first dielectric layer, $d_2$ is the partial or overall thickness ($\mu$m) of the second dielectric layer, $d_x$ is the partial or overall thickness ($\mu$m) of the first dielectric layer, and $d_{ed}$ is the thickness ($\mu$m) of the transparent electrode.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

Figure 1:
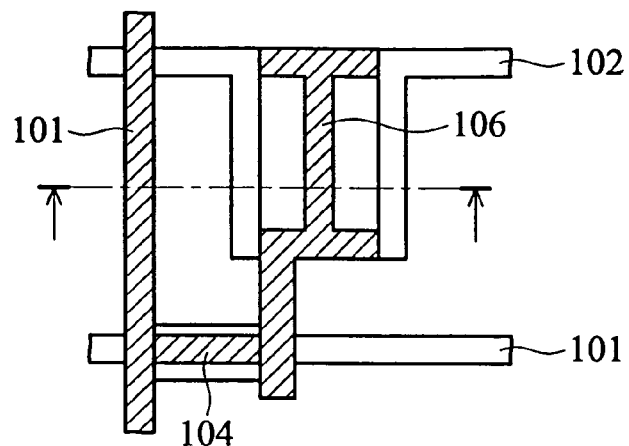
FIG. 1 is a schematic top view showing a lower substrate of a conventional IPS type LCD.

REFERENCE NUMERALS IN THE DRAWINGS 10 dielectric layer
20 first transparent dielectric layer
21 dielectric layers
22 second transparent dielectric layer
23 dielectric layer
24 third transparent dielectric layer
30 alignment layer
40 first electrode
42 second transparent electrode
50 second electrode
52 second transparent electrode
$d_1$ partial or overall thickness of the first dielectric layer
$d_2$ partial or overall thickness of the second dielectric layer
$d_{ed}$ thickness (μm) of the transparent electrode
$d_{ed1}$ predetermined thickness
$d_{ed2}$ predetermined thickness

DETAILED DESCRIPTION OF THE INVENTION

The invention provides a structure for reducing the diffraction effect caused by periodic electrode arrangements in lateral (horizontal) electric field. The conventional protective dielectric layers are replaced by multiple (two or more) layers of transparent dielectric materials with different diffraction indices. These transparent dielectric layers are formed among the periodic electrodes. Thickness of various transparent dielectric layers is modified so that the diffraction index and thickness of various dielectric layers and the transparent electrodes satisfy the following formula (I). Optical paths of the incident lights at the electrode protective layers and the transparent electrodes are identical.

$$0.8n_{ed}d_{ed} \leq n_1d_1 + n_2d_2 + \ldots + n_xd_x \leq 1.2n_{ed}d_{ed} \quad \text{Formula (I)}$$

wherein $n_1$ is the diffraction index of the first dielectric layer, $n_2$ is the diffraction index of the second dielectric layer, $n_x$ is the diffraction index of the $x^{th}$ dielectric layer, $n_{ed}$ is the diffraction index of the transparent electrode, $d_1$ is the partial or overall thickness (μm) of the first dielectric layer, $d_2$ is the partial or overall thickness (μm) of the second dielectric layer, $d_x$ is the partial or overall thickness (μm) of the first dielectric layer, and $d_{ed}$ is the thickness (μm) of the transparent electrode.

The invention also features a structure for reducing the diffraction effect in periodic electrode arrangements operating under In Plane Switching (IPS) mode, or the so-called lateral electric field mode. The original protective dielectric layers are now substituted by multiple (two or more) layers of transparent dielectric materials having different diffraction indices. These transparent dielectric layers are disposed among the periodic electrodes. Thickness of the various transparent dielectric layers is modified so that the diffraction index and thickness of various dielectric layers and the transparent electrodes satisfy the following formula (I). Optical paths of the incident lights at the electrode protective layers and the transparent electrodes are identical.

In a preferred embodiment, the invention also provides a structure for reducing the diffraction effect in periodic electrode arrangements operating in fringe-field switching mode.

Dielectric layers in this invention are also used as dielectric material for protecting electrodes. The dielectric layers are preferably transparent dielectric materials, such as silicon-rich oxides or nitrides formed by CVD, titanium dioxide, zinc oxide, Cerium dioxide, Zinc sulfide or fluorine-containing glass.

In the invention, dielectric layers comprising two or more layers are disposed among periodic electrodes.

Periodic electrodes in the invention are preferably transparent electrodes, such as ITO, IZO, AZO or ZnO.

The invention provides a structure for reducing the diffraction effect in periodic electrode arrangements. The novel structure is obtained by forming multiple (two or more) transparent dielectric layers among periodic electrodes and modifying the thickness of the various transparent dielectric layers. Therefore, optical paths of the incident lights at the various dielectric layers and the transparent electrodes are identical. The structure provided in the invention is applicable for LCDs with periodic electrode arrangements operated in lateral electric field, IPS or FFS mode.

First Embodiment

Figure 2:
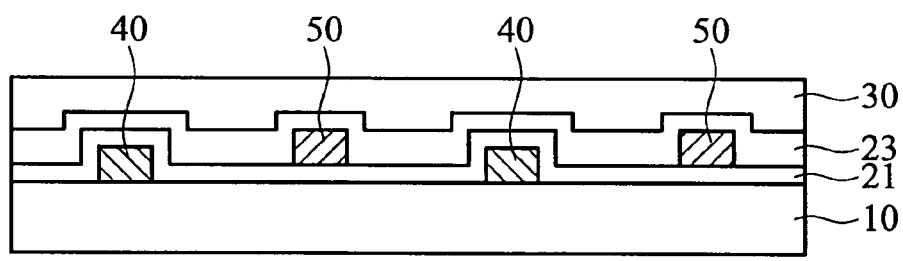
FIG. 2 is cross section along the line II-II' in FIG. 1.

FIG. 2 is a cross section along the line II-II' of the lower substrate in FIG. 1. The second electrode 0.50 is a transparent electrode, and the dielectric layer 23 is a transparent dielectric layer. Due to different optical paths of incident lights, light diffracts due to the diffraction effect in this periodic electrode arrangements.

The first embodiment is designed to reduce the diffraction effect for the structure described above.

Figure 3:
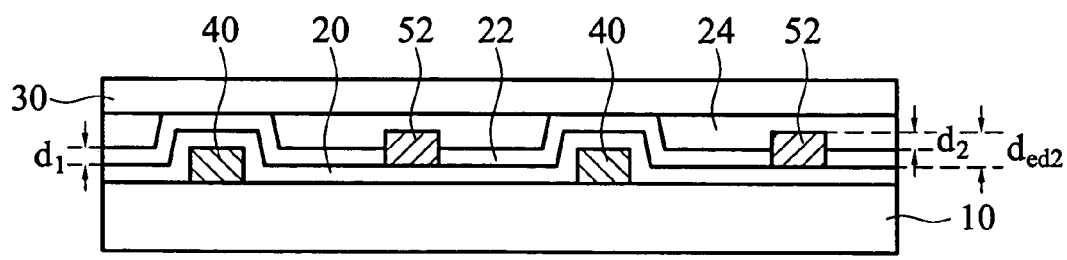
FIG. 3 is cross section of the lower substrate of the first embodiment of the invention.
Figure 4A:
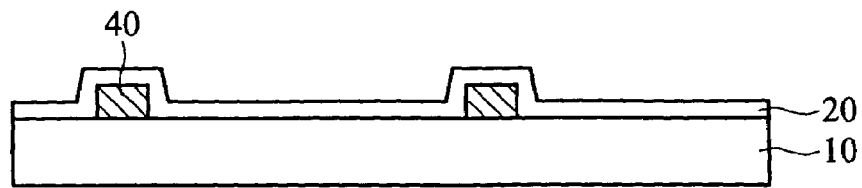
FIGS. 4a to 4e are flowcharts showing the process of the first embodiment of the invention.
Figure 4B:
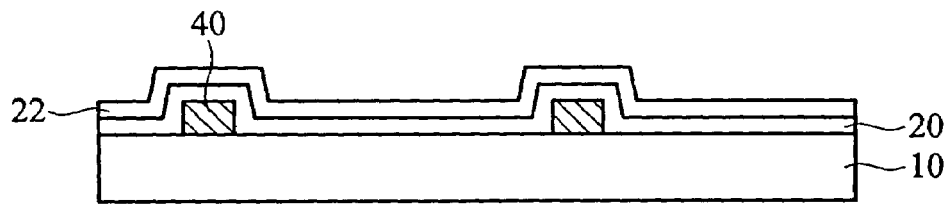

FIG. 3 is a cross section showing the lower substrate of the first embodiment of the invention. In FIG. 4a, a dielectric layer 10 having first electrodes 40 formed thereon is provided, and a first transparent dielectric layer 20 is formed to cover the first electrodes. A second transparent dielectric layer 22 having a predetermined thickness $d_1$ is then formed on the first transparent dielectric layer 20, as shown in FIG. 4b.

Figure 4C:
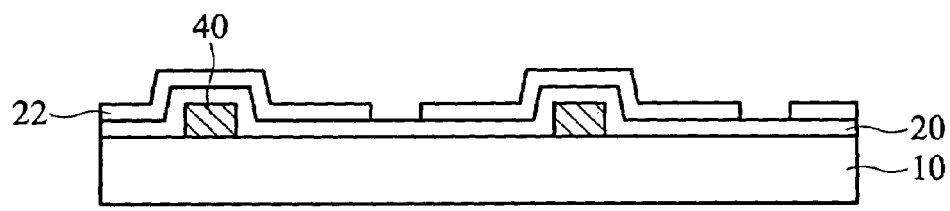
Figure 4D:
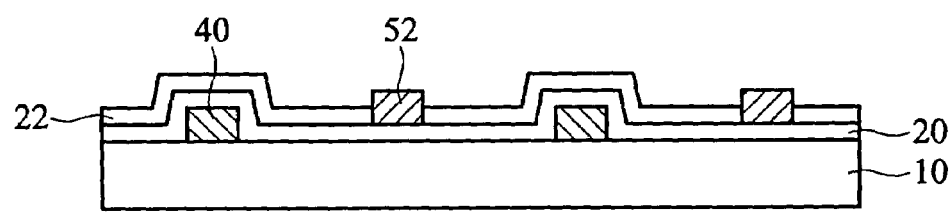

Then, the second transparent dielectric layer 22 is etched using the first transparent dielectric layer 20 as an etch stop layer, thus defining transparent electrode areas, as shown in FIG. 4c. A second transparent electrode 52 is then formed in the transparent electrode areas. That is, the second transparent electrode 52 with a predetermined thickness $d_{ed}$ is formed in the etched areas in the second transparent dielectric layer, as shown in FIG. 4d.

Figure 4E:
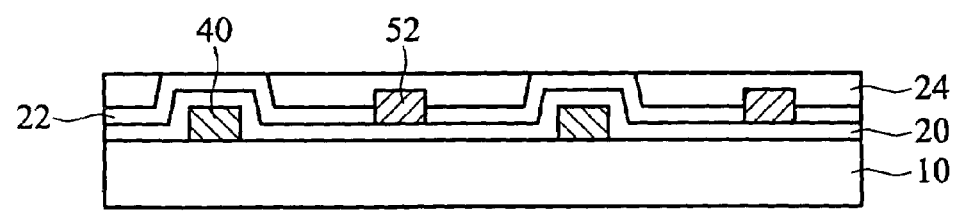

A third transparent dielectric layer is then plated on the second transparent electrode 52 and the second transparent dielectric layer 22, followed by etching using the second transparent dielectric layer 22 as an etch stop layer. The third transparent dielectric layer 24 is shown in FIG. 4e. Finally, an alignment layer 30 is formed.

In this embodiment, the first electrode 40 is aluminum, the second transparent dielectric layer 22 is silicon oxide, having a diffraction index of $n_1$. The third transparent dielectric layer 24 is silicon dioxide having a diffraction index of $n_2$. The second transparent electrode 52 is ITO glass having a diffraction index of $n_{ed}$. Thickness of the second transparent dielectric layer 22 and the second transparent electrode 52 is $d_1$ (μm), and $d_{ed}$ (μm) respectively. Thickness of the third transparent dielectric layer 24 is $d_2$ (μm), i.e. $d_{ed}-d_1$ (μm).

$n_1$, $n_2$, $n_{ed}$, $d_1$, $d_2$ and $d_{ed}$ satisfy the following formula (II):

$$n_1 d_1 + n_2 d_2 = n_{ed} d_{ed}$$

Second Embodiment

FIG. 2 is cross section along the line II-II' of the lower substrate in FIG. 1. The second electrode 40 is a transparent electrode, and the dielectric layers 21 and 23 are transparent dielectric layers. Due to different optical paths of incident lights, light diffracts due to the diffraction effect in this periodic electrode arrangements.

Figure 5:
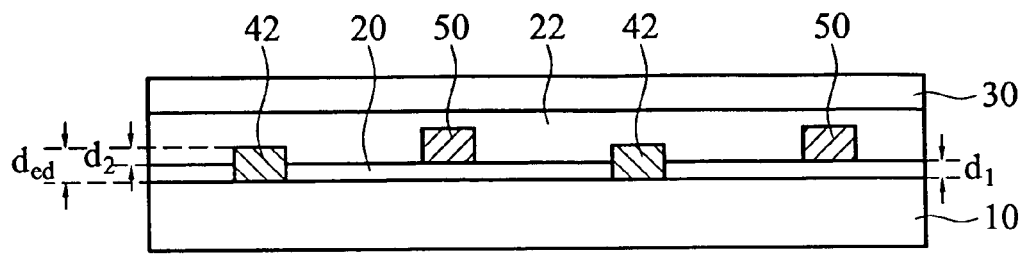
FIG. 5 is cross section of the lower substrate of the second embodiment of the invention.

The second Embodiment is designed to solve the diffraction problem in the above structure. FIG. 5 is cross section showing the lower substrate of the second embodiment of the invention. A transparent dielectric layer 20 having a predetermined thickness $d_1$ is formed on a dielectric layer 10, followed by etching the first transparent dielectric layer 20 to define the transparent electrode areas. Transparent electrodes 42 are then plated onto the transparent electrode areas.

The second transparent electrode 42 is then etched using the first transparent dielectric layer 20 as an etch stop layer, thus forming a transparent electrode 42 having a predetermined thickness $d_{ed}$.

Electrodes 50 are then formed on the electrode areas in the first transparent dielectric layer 20, followed by the formation of a second transparent dielectric layer 22. Finally, an alignment layer 30 is formed.

In this embodiment, the first transparent electrode 42 is ITO having a diffraction index of $n_{ed}$, and the first transparent dielectric layer 20 is titanium dioxide with a diffraction index of $n_1$. The second transparent dielectric layer 22 is silicon dioxide having a diffraction index of $n_2$. The second electrode 50 is transparent ITO. Thickness of the first transparent dielectric layer and the first transparent electrode 42 is $d_1$ (μm), and $d_{ed}$ (μm) respectively. Thickness of the second transparent dielectric layer 22 is $d_2$ (μm), i.e. $d_{ed}-d_1$ (μm).

$n_1$, $n_2$, $n_{ed}$, $d_1$, $d_2$ and $d_{ed}$ satisfy the following formula (III):

$$n_1 d_1 + n_2 d_2 = n_{ed} d_{ed}$$

Third Embodiment

FIG. 2 is cross section along the line II-II' of the lower substrate in FIG. 1. The first electrode 40 and the second electrode 50 are transparent electrodes, and the dielectric layers 21 and 23 are transparent dielectric layers. Due to different optical paths of incident lights, light diffracts due to the diffraction effect in this periodic electrode arrangement.

Figure 6:
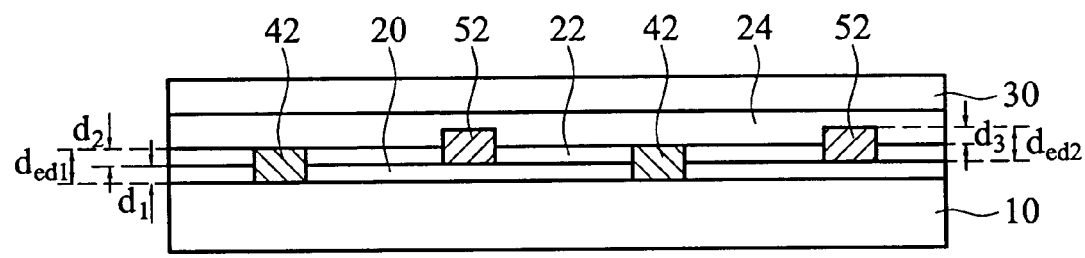
FIG. 6 is cross section of the lower substrate of the 3$^{rd}$ embodiment of the invention.

The third embodiment is designed to reduce the diffraction effect in the above structure. FIG. 6 is cross section showing the lower substrate of the $3^{rd}$ embodiment of the invention. A transparent dielectric layer 20 having a predetermined thickness $d_1$ and a first transparent electrode 42 having a predetermined thickness $d_{ed1}$ are formed on a dielectric layer 10. A second transparent dielectric layer 22 having a predetermined thickness $n_2$ is then formed on the first transparent dielectric layer 20 and the first transparent electrode 42.

The second transparent dielectric layer 22 is etched using the first transparent dielectric layer 20 as an etch stop layer to define the transparent electrode areas. Second transparent electrodes 52 having a predetermined thickness $d_{ed2}$ are then plated onto the transparent electrode areas.

A third transparent dielectric layer 24 is then formed on the second transparent electrode 52 and the second transparent dielectric layer 22. Finally, an alignment layer 30 is formed, as shown in FIG. 6.

In this embodiment, the first transparent electrode 42 is ITO having a diffraction index of $n_{ed1}$, and the second transparent electrode 52 is IZO having a diffraction index of $n_{ed2}$. The first transparent dielectric layer 20 is silicon oxide with a diffraction index of $n_1$. The second transparent dielectric layer 22 is silicon dioxide having a diffraction index of $n_2$. The third transparent dielectric layer 24 is titanium dioxide having a diffraction index of $n_3$. Thickness of the first transparent dielectric layer and the first transparent electrode 42 is $d_1$ (μm), and $d_{ed1}$ (μm) respectively. Thickness of the second transparent electrode 52 is ded2 (μm). Thickness of the second transparent dielectric layer 22 is $d_2$ (μm), i.e. $d_{ed1}-d_1$ (μm). Thickness of the third transparent dielectric layer 24 is $d_3$ (μm), i.e. $d_{ed2}-d_2$ (μm).

$n_1$, $n_2$, $n_{ed1}$, $n_{ed2}$, $d_1$, $d_2$, $d_{ed1}$ and $d_{ed2}$ must satisfy the following formula (IV):

$$n_1 d_1 + n_2 d_2 + n_3 d_3 = n_{ed1} d_{ed1} + n_3 d_3 = n_{ed2} d_{ed2} + n_1 d_1$$

Fourth Embodiment

Figure 7:
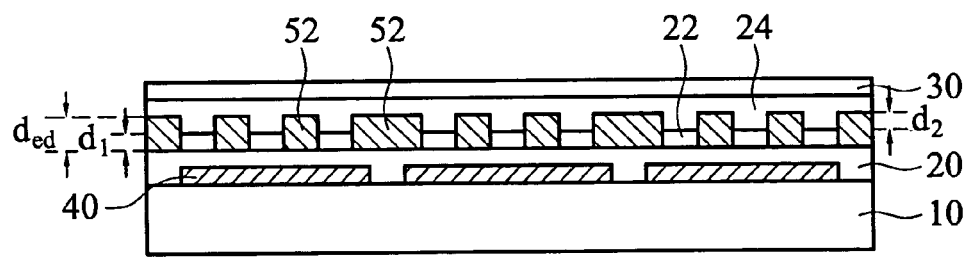
FIG. 7 is cross section of the lower substrate of the fourth embodiment of the invention.

FIG. 7 illustrates the structure for reducing the diffraction effect in a periodic electrode arrangement operating in fringe-field switching mode.

Figure 8A:
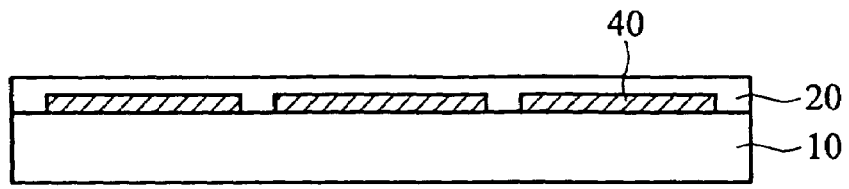
FIGS. 8a to 8e are flowcharts showing the process of the fourth embodiment of the invention.
Figure 8B:
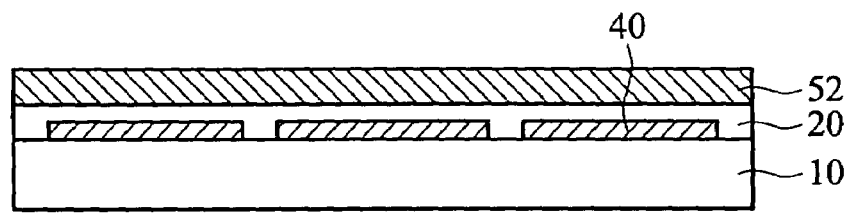
Figure 8C:
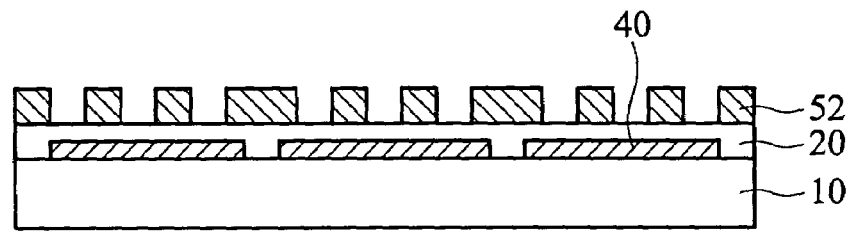

First, a dielectric layer 10 having first electrodes 40 formed on the surface is provided. A first transparent dielectric layer 20 is then formed on the first dielectric layer 10 to cover the first transparent electrodes 40, as shown in FIG. 8a. In FIG. 8b, a second transparent electrode 52 having a predetermined thickness $d_{ed}$ is formed. Next, the second transparent electrode 52 is etched using the first transparent dielectric layer 20 as an etch stop layer to define the second transparent electrode 52, as shown in FIG. 8c.

Figure 8D:
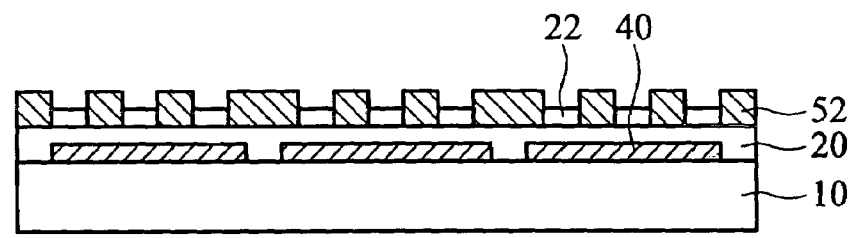
Figure 8E:
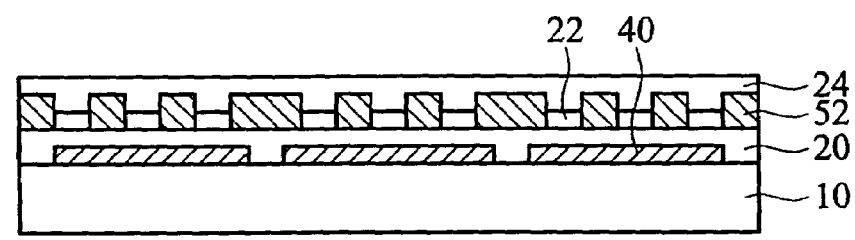

A second transparent dielectric layer 22 is then plated, followed by etching to form a second transparent dielectric layer 22 having a predetermined thickness n1 between the second electrodes 52, as shown in FIG. 8d. A third transparent dielectric layer 24 is then formed to cover the second electrodes 52 and the second transparent dielectric layer 22, as shown in FIG. 8e. Finally, an alignment layer 30 is formed.

In this embodiment, the first transparent electrode 40 is aluminum and the second electrode 22 is titanium dioxide having a diffraction index of $n_1$. The third transparent dielectric layer 24 is silicon dioxide with a diffraction index of $n_2$. The second transparent electrode 52 is ITO glass having a diffraction index of $n_{ed}$. Thickness of the second transparent dielectric layer and the second transparent electrode 52 is $d_1$ (μm), and $d_{ed}$ (μm) respectively. Thickness of the third transparent dielectric layer 24 is $d_2$, i.e. $d_{ed}-d_1$ (μm).

$n_1$, $n_2$, $n_{ed1}$, $n_{ed2}$, $d_1$, $d_2$, $d_{ed1}$ and $d_{ed2}$ must satisfy the following formula (IV):

$$n_1 d_1 + n_2 d_2 = n_{ed} d_{ed}$$

Fifth Embodiment

The fifth embodiment is an alternative process for forming the structure of the lower substrate described in the fourth embodiment.

Figure 9A:
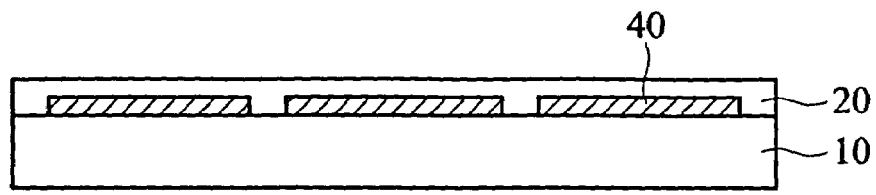
FIGS. 9a to 9e are flowcharts showing the process of the fifth embodiment of the invention.
Figure 9B:
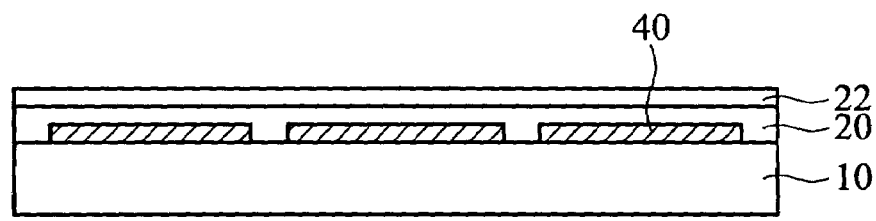
Figure 9C:
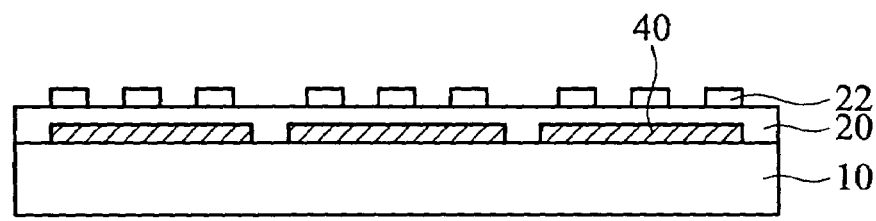

First, a dielectric layer 10 having first electrodes 40 formed on the surface is provided. A first transparent dielectric layer 20 is then formed on the first dielectric layer 10 to cover the first transparent electrodes 40, as shown in FIG. 9a. In FIG. 9b, a second dielectric layer 22 having a predetermined thickness $d_1$ is formed. Next, the second transparent dielectric layer 22 is etched using the first transparent dielectric layer 20 as an etch stop layer to define the electrode areas, as shown in FIG. 9c.

Figure 9D:
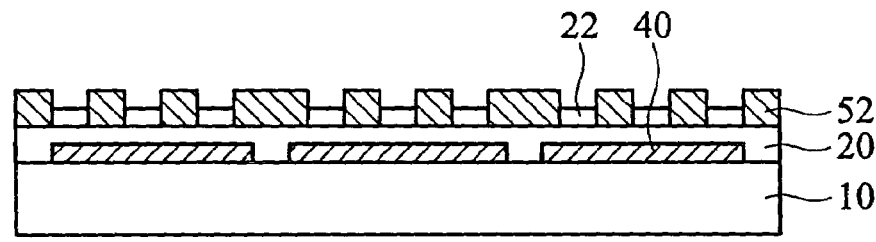
Figure 9E:
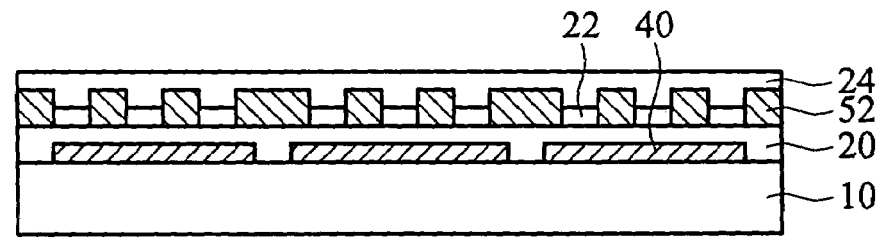
Figure 10:
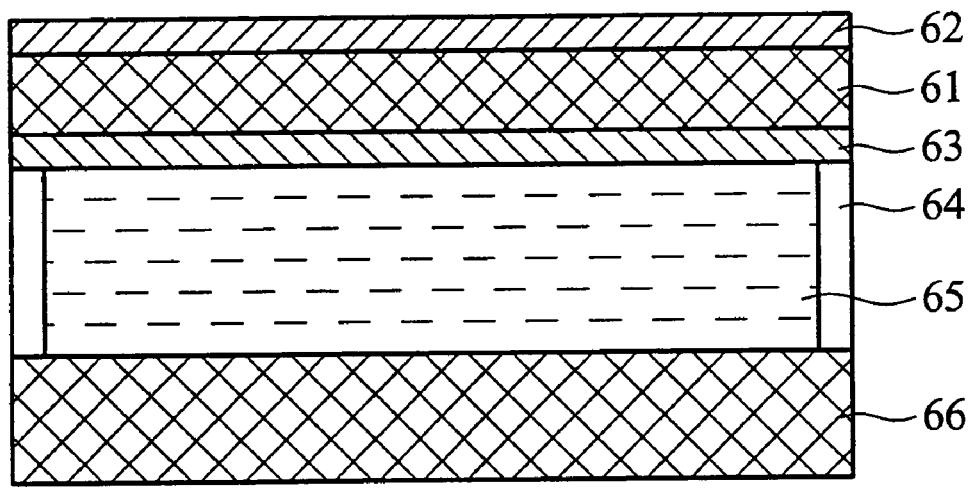
FIG. 10 is an exploded schematic view of a liquid crystal display (LCD).

Second transparent electrodes 52 having a predetermined thickness $d_{ed}$ are then plated on the electrode areas in the second transparent dielectric layer 22. Etching is then performed using the second transparent dielectric layer 22 as the etch stop layer to form the second transparent electrodes 52 shown in FIG. 9d. A third transparent dielectric layer 24 is then formed to cover the second electrodes 52 and the second transparent dielectric layer 22, as shown in FIG. 9e. Finally, an alignment layer 30 is formed.

In this embodiment, the first transparent electrode 40 is aluminum and the second transparent dielectric 22 is titanium dioxide having a diffraction index of $n_1$. The third transparent dielectric layer 24 is silicon dioxide with a diffraction index of $n_2$. The second transparent electrode 52 is ITO having a diffraction index of $n_{ed}$. Thickness of the second transparent dielectric layer and the second transparent electrode 52 is $d_1$ ($\mu$m), and $d_{ed}$ ($\mu$m) respectively. Thickness of the third transparent dielectric layer 24 is $d_2$, i.e. $d_{ed}$-$d_1$ ($\mu$m).

$n_1$, $n_2$, $n_{ed}$, $d_1$, $d_2$, and $d_{ed}$ must satisfy the following formula (V):

$$n_1 d_1 + n_2 d_2 = n_{ed} d_{ed}$$

In summary, the advantages of the invention include the following. Reduced diffraction effect in periodic electrode arrangements for lateral electric field (pixel electrodes and common electrodes are disposed simultaneously on the TFT matrix substrate), thus increasing light utilization rate. Improving the reduced contrast caused by diffraction effect when using an IPS type LCD, while increasing the viewing angle to 170°. Reducing the diffraction effect caused by large-angle diffraction light in projection systems where only diffracted lights with smaller angles are collected, thus greatly enhancing the light collection efficiency thereof.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A structure for reducing the diffraction effect in periodic electrode arrangements, comprising:
   a plurality of first electrodes and a plurality of second electrodes, wherein the first electrodes and the second electrodes are periodically disposed and one of the two or both are transparent electrodes;
   multiple layers of transparent dielectric layers having different diffraction indexes, formed in predetermined thicknesses between the plurality transparent electrodes, wherein the diffraction index and the thickness of the transparent dielectric layers and the transparent electrodes satisfy the following equation:

$$0.8 n_{ed} d_{ed} \leq n_1 d_1 + n_2 d_2 + \ldots + n_x d_x \leq 1.2\, n_{ed} d_{ed}$$

wherein $n_1$ is the diffraction index of the first dielectric layer, $n_2$ is the diffraction index of the second dielectric layer, $n_x$ is the diffraction index of the $x^{th}$ dielectric layer, $n_{ed}$ is the diffraction index of the transparent electrode, $d_1$ is the thickness of the first dielectric layer from a region defined between planes defined by the transparent electrode, $d_2$ is the thickness of the second dielectric layer from a region defined between planes defined by the transparent electrode, $d_x$ is the thickness of the first $x^{th}$ dielectric layer from a region defined between planes defined by the transparent electrode, $d_{ed}$ is the thickness of the transparent electrode, and $d_{ed}$ is equal to the sum of $d_1$, $d_2$, ..., and $d_x$.

2. The structure as claimed in claim 1, wherein the transparent dielectric layer is silicon-rich oxide or nitride formed by chemical vapor deposition.

3. The structure as claimed in claim 1, wherein the transparent dielectric layer is titanium dioxide, zinc oxide, Cerium dioxide or zinc sulfide.

4. The structure as claimed in claim 1, wherein the transparent dielectric layer is fluorine-containing glass.

5. The structure as claimed in claim 1, wherein the transparent electrodes are ITO, IZO, AZO or ZnO.

6. The structure as claimed in claim 1, wherein the partial or overall thickness of the dielectric layer is the combined thickness of the dielectric layer and the transparent electrodes.

7. A liquid crystal display device, comprising:
   an active matrix substrate;
   a second substrate, disposed opposite the active matrix substrate; and
   liquid crystal, filled in between the two substrates;
   wherein the active matrix substrate comprises:
   a pixel comprised of a pixel electrode disposed as a matrix and a common electrode; and
   an switching element formed on the liquid crystal side of the first substrate, for controlling the operation of the pixel, above which a number of signal lines and scanning lines intersect,
   wherein one or both of the pixel electrodes and the common electrodes are transparent, and their structure is as claimed in claim 1.

8. The device as claimed in claim 7, wherein the active matrix substrate is a thin film transistor matrix substrate.

9. The device as claimed in claim 7, wherein the liquid crystal display device is a liquid crystal display device in lateral electric field switching mode comprising periodically-disposed electrodes.

10. The device as claimed in claim 7, wherein the liquid crystal display device is a liquid crystal display device in plane switching mode comprising periodically-disposed electrodes.

11. The device as claimed in claim 7, wherein the liquid crystal display device is a liquid crystal display device in fringe-field switching mode comprising periodically-disposed electrodes.

12. The device as claimed in claim 7, wherein the liquid crystal display device is an LCD projector.

13. The device as claimed in claim 7, wherein the liquid crystal display device is a reflective display device.

14. The device as claimed in claim 7, wherein the liquid crystal display device is semi-transparent display device.

* * * * *